United States Patent [19]
Wanner et al.

[11] Patent Number: 5,222,759
[45] Date of Patent: Jun. 29, 1993

[54] APPARATUS FOR ACTIVE CONTROL OF BODY MOTIONS IN MOTOR VEHICLES

[75] Inventors: Michael Wanner, Holzgerlingen, Fed. Rep. of Germany; Dean Karnopp, Davis, Calif.

[73] Assignee: Robert Bosch GmbH, Stuttgart, Fed. Rep. of Germany

[21] Appl. No.: 915,394

[22] Filed: Jul. 20, 1992

Related U.S. Application Data

[63] Continuation-in-part of Ser. No. 655,522, Feb. 14, 1991, abandoned.

[30] Foreign Application Priority Data

Feb. 27, 1990 [DE] Fed. Rep. of Germany ....... 4006109

[51] Int. Cl.⁵ .......................................... B60G 17/033
[52] U.S. Cl. .................................. 280/697; 280/707; 280/708
[58] Field of Search ............ 280/690, 692, 697, 708, 280/710, 712, 714, 715, 707; 267/221, 222, 225, 34, 64.24, 64.26, 151

[56] References Cited

U.S. PATENT DOCUMENTS

| | | | |
|---|---|---|---|
| 2,989,301 | 6/1961 | Johannsen | 267/34 |
| 3,290,035 | 12/1966 | Enke | 267/34 |
| 3,368,824 | 2/1968 | Julien | 267/34 |
| 3,399,905 | 9/1968 | Vogel | 267/222 X |
| 4,786,034 | 11/1988 | Heess et al. | 267/64.15 |
| 4,887,699 | 12/1989 | Ivers et al. | 267/221 X |
| 4,898,264 | 2/1990 | Miller | 267/221 X |

FOREIGN PATENT DOCUMENTS

| | | |
|---|---|---|
| 1275882 | 8/1968 | Fed. Rep. of Germany . |
| 2736026 | 2/1978 | Fed. Rep. of Germany . |
| 3304815 | 11/1983 | Fed. Rep. of Germany . |
| 3610937 | 10/1987 | Fed. Rep. of Germany . |
| 1341266 | 9/1963 | France ................................ 280/710 |
| 0201946 | 9/1986 | Japan .................................... 267/34 |
| 1382714 | 11/1988 | U.S.S.R. .............................. 267/34 |

Primary Examiner—Tamara L. Graysay
Attorney, Agent, or Firm—Edwin E. Greigg; Ronald E. Greigg

[57] ABSTRACT

An apparatus for active control of body motions of a motor vehicle, to reduce undesired vehicle motion, to improve the rise and simultaneously adjust the level of the vehicle, while requiring very little energy overall, comprising three structural elements disposed in a parallel operative arrangement, namely an extremely soft compensation spring, which bears the majority of the static weight of the vehicle body; a final control element, the behavior of which is triggerable via an electronic control unit and which may be embodied pneumatically or hydraulically and in each case includes a spring element function that reacts in the manner of a substantially stiffer final control element spring; and as the third element, a semiactive damper, in which throttle valves for a tension and compression stage are triggered either in opposite directions or the same directions, depending upon which active or passive damping signals are to be processed.

20 Claims, 4 Drawing Sheets

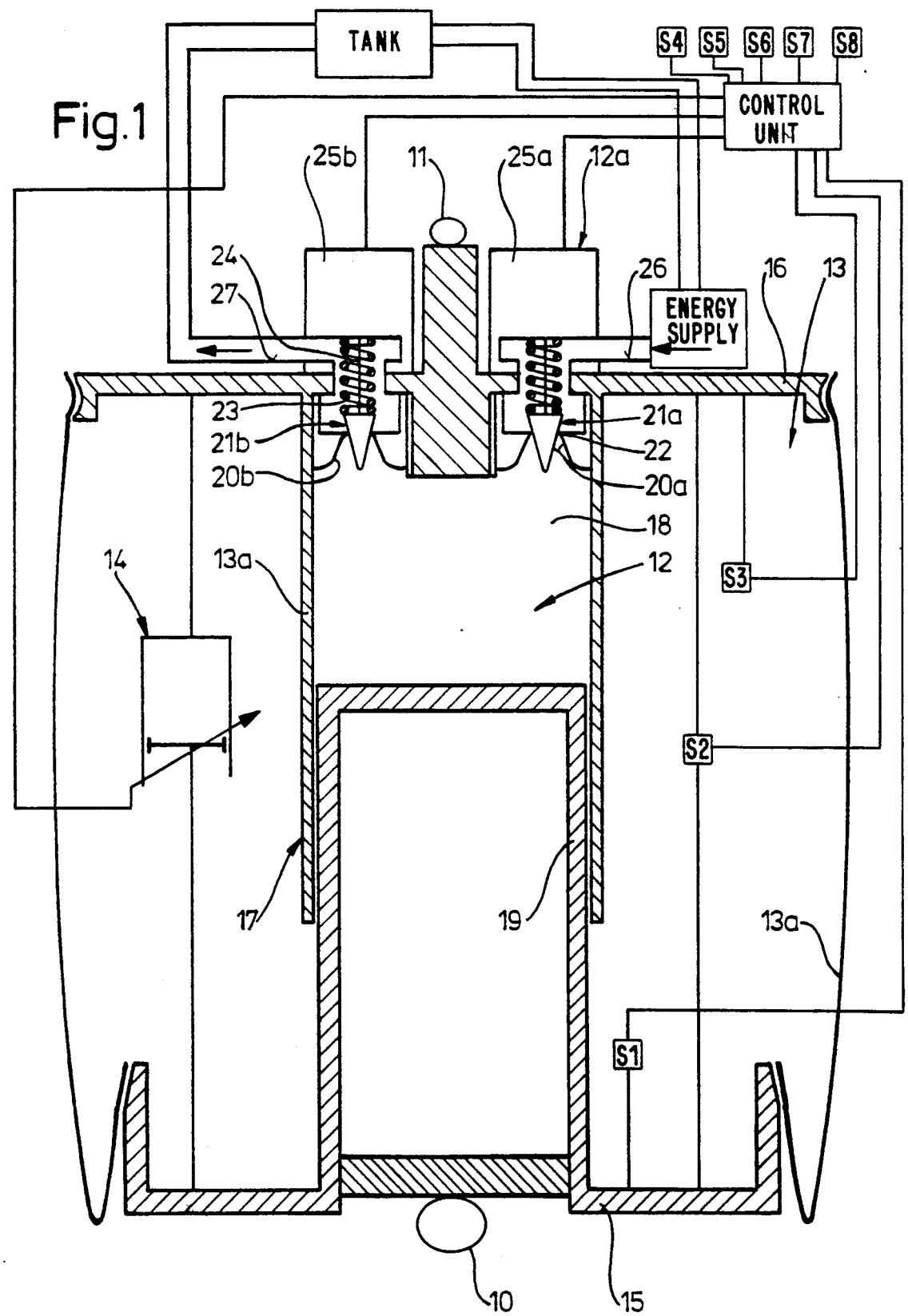

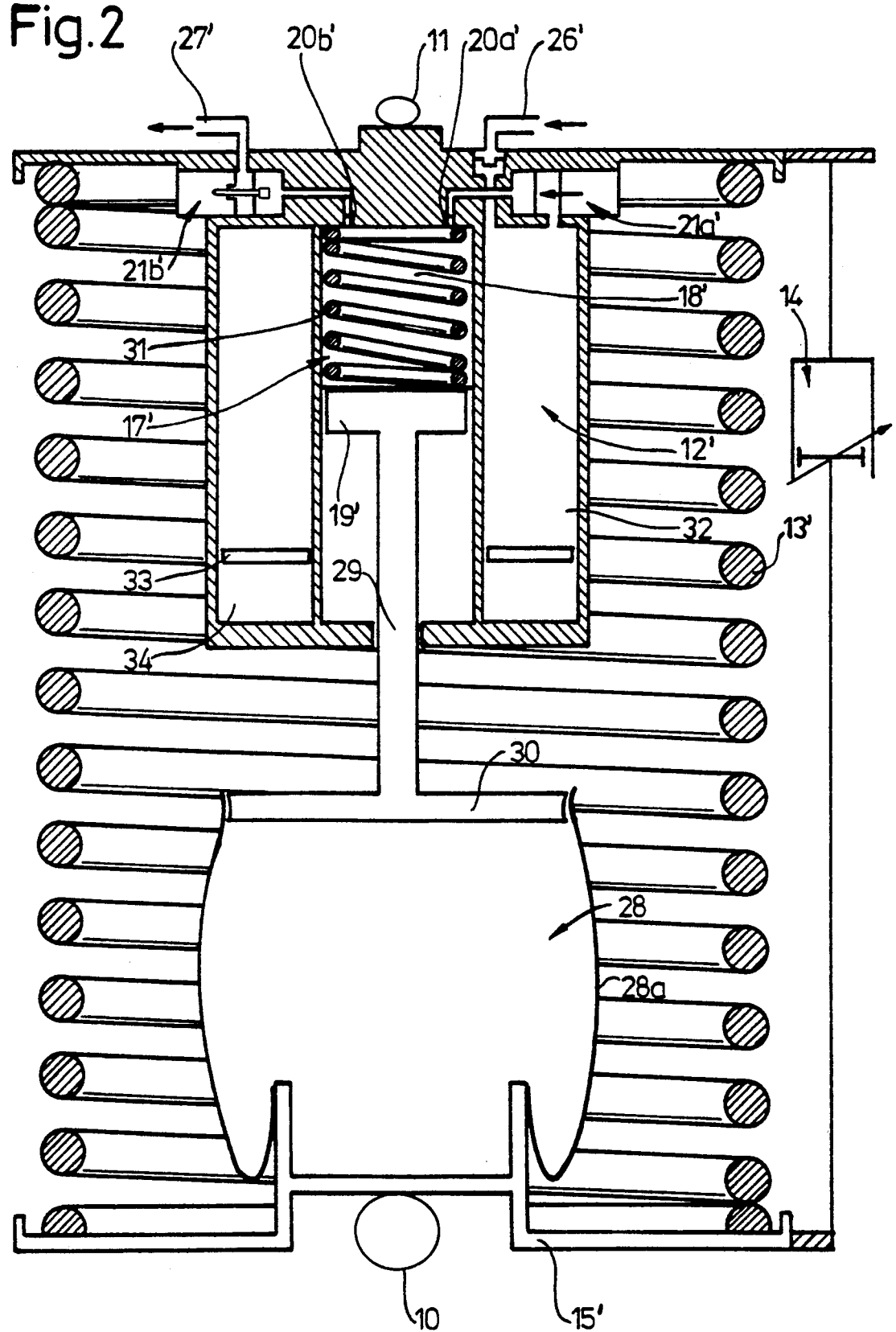

APPARATUS FOR ACTIVE CONTROL OF BODY MOTIONS IN MOTOR VEHICLES

This is a continuation-in-part of copending application Ser. No. 07/655,522 filed on Feb. 14, 1991 now abandoned.

BACKGROUND OF THE INVENTION

The invention is based on an apparatus for active control of body motions in motor vehicles for reducing undesired vehicle motion and improving the comfort of the ride, as defined hereinafter. An essential feature is that as an integral component of the body control, the present invention includes the concept of fast level adjustment, which is obtained in combination with the active control components that provide the control of the body motion in the range of the natural frequency of the vehicle body, from the standpoint of minimum energy consumption.

To provide conventional level adjustment systems, it is known to integrate the level adjustment with the shock absorber in the control situation, in vehicles having steel springs; such a shock absorber pumps up to the desired control height in the vehicle body automatically, for example, and in response to the vertical vehicle motion. In vehicles with air springs, level adjustment can be achieved via suitable external sensors; with the aid of the air spring, which is supplied with a suitably larger quantity of pressure fluid when loaded, finally, it is also known, in vehicles having so-called hydropneumatic suspensions, to provide level adjustment with the aid of a hydraulic final control element. However, it is a common problem to all these known systems that when the load changes only the body position, that is, the height of the vehicle body above the ground, is controlled, and such systems are designed solely for this provision; a suitable control process has an extremely slow course, lasting at least several seconds at minimum and as long as several minutes, so that it is impossible to cancel out dynamic load fluctuations, for instance action upon the current state of the vehicle or rapidly evolving motions of the vehicle body, given the relatively low energy and power needed for such conventional level adjusting systems.

On the other hand, although fully active hydraulic chassis systems enable optimal chassis control in terms of the comfort of the ride and vehicle handling, they nevertheless prove to be unrealistically expensive, and even if replacement components are provided to economize on power, they still have very high power requirements. Such known active systems can also be considered critical from the standpoint of system stability and reliability.

Known equipment with which the spring stiffness in resilient wheel suspension systems in vehicles can be varied automatically or by open-loop control (German Patent Document A 2 604 809; German Patent Document B 1 275 882), adjust the spring stiffness as a function of the vehicle speed and other parameters, by connecting a bellows of variable volume, as a first pressure chamber, to further pressure chambers each having a constant volume, via a passageway, in the case of purely air-type suspension for vehicles (German Patent Document B 1 275 882). A valve that effects progressively greater throttling (to make the suspension more rigid) upon major spring deflection may be provided in the connecting lines between the pressure chambers, or valves that automatically close in one direction are provided, but such valves do not respond to external load and motion parameters with selective triggering. It must therefore be assumed that the known air suspension, with other pressure chambers that can be additionally put into operation, reacts comparatively unspecifically to external conditions, and upon slow motion of the suspension specifies a spring rigidity that generally reacts more softly, then becoming increasingly rigid upon fast or deep spring deflection; clearly, the desired progressive suspension characteristic is also attained by this means.

In contrast to this, in the case of the subject of German Patent Document A 2 604 809, corresponding to the controllable hydropneumatic or pneumatic spring element, the procedure is such that as a function of a trigger circuit reacting to external parameters, a change in volume effected by a control motor takes place in the second pressure chamber, so that depending on the desired suspension behavior (soft or harder), a correspondingly larger or smaller volume is then made available for the pressure equalization, via a connecting line. Since excess pressure fluid is produced if there is a reduction in volume in the second pressure chamber, the known controllable spring element absolutely demands an additional but otherwise independent level adjustment, via which pressure fluid can drain away, which is shown in FIG. 3 of the aforementioned patent reference. Contrarily, FIG. 2 of the reference already discloses closing or opening the connecting line between the two pressure chambers, which then have constant volume, via a final control element (valve) when there is a controllable spring element that in that case is hydropneumatic; the final control element may be a slide and may be driven by a control motor via a drive pinion that meshes with a gear wheel. Then, via a threaded portion, the gear wheel actuates the final control element in the closing or opening direction. Since as in the exemplary embodiment of FIG. 3 referred to earlier, the volumetric change in the second pressure chamber can take place only gradually via a spindle drive of this kind, the overall result is that only slow adjusting motions are possible; fast switches, for instance to react to emergency situations, cannot be achieved, and such adaptations of the suspension in its rigidity behavior can be achieved, at some expense, but only in the way that could also be more simply achieved purely with slow-reaction level control.

Finally, similarly to the exemplary embodiment of FIG. 2 of German Patent Document A 26 04 809, it is already known in German Patent Document A 27 36 026, in an adjustable wheel suspension system for vehicles, to dispose a fast switchover valve between the two pressure chambers, one of which is coupled directly to the wheel motion; this valve makes the total spring rigidity harder to avoid dangerous operating states in motor vehicles (such as impairment of vehicle stability or handling) by disconnecting the connecting line between the two pressure chambers and reopening it if the operating states change. A known adjustable wheel suspension for vehicles of this kind, however, makes do without the ability by adaptive learning behavior to adjust gradually to various operating states of the vehicle, because with a motor vehicle, it must be expected during operation that it will sometimes travel for long periods of time over smooth roads in good repair, such as Autobahns, or on bumpy lanes, thus requiring not only adaptive long-term adjustment of the suspension behavior but also a rapid reaction to possibly lightning-fast changes in operation, such as side wind when traveling over high bridges and the like, or fast cornering; these latter two driving conditions require immediate stiffening of the suspension system.

Means are also generally known for controlling spring stiffness (DE-C 16 30 058), in which two work chambers of a shock absorber or spring strut are connected via external lines to an apparatus that comprises a pump and two reservoirs. Only one-way check valves are provided as valves in the connecting lines to the spring strut. With this kind of apparatus, however, the damper hardness of such a shock absorber cannot be varied, because to do so energy must be supplied from outside—via the pump—which takes place relatively slowly and requires a certain amount of power. In a shock absorber, controlling the damper hardness only is also known from DE-A 33 04 815.

Suspension systems of modern widely-used vehicle types, especially passenger vehicles, are typically optimized in terms of spring hardness and damper hardness, to an average operating situation; parameters are defined structurally, and except for the effects of aging then remain unchanged during driving. However, in extreme operating situations, such as when the vehicle is empty or fully loaded, or when motion parameters of the vehicle are varying (fast cornering, braking, acceleration, smooth Autobahn travel, or the like), this is problematic and in some cases is not optimal.

Furthermore, semiactive dampers of the kind known from German Offenlegungsschrift 36 10 937 can be used in the present invention; they include a cylinder divided by a piston into two work chambers, and open-loop-controlled hydraulic throttle valves are provided for the applicable direction of motion (tension stage, compression stage), connected either in series or in parallel; connected parallel to each of them is a check valve opening in the opposite direction, and all the connections of the valves remote from the work chamber connections are combined; as a result the damping system, overall and separately, undergoes both passive and semiactive damping variation by suitable triggering of the valves. This particular patent document is expressly referred to herein in combination with the present invention, because the inclusion of such semiactive damper elements as described there is also intended supplementally in the present invention as well, as a component of the entire component assembly, to achieve stable system performance and optimal function. This semiactive damping described in German Offenlegungsschrift 36 10 937 can also be attained by using a single control valve, which is either external or integrated in the damper and is in a position to adjust high-frequency damper forces.

Finally, reference is made to a known apparatus for active chassis control in motor vehicles disclosed in German Offenlegungsschrift 37 38 284, which is based on known level adjustment means and includes a first active final control element, acted upon as a function of the relative spring deflection part, for the level adjusting system and a second active final control element, in the form of an active or aforementioned semiactive damper between wheel suspensions and the body; both active final control elements are integrated into a common closed-loop control circuit, which uses both the relative spring deflection path and the vertical absolute speed of the body to trigger the two final control elements, but to do so requires increased energy, so that it is the object of the present invention to create a component assembly that enables active chassis control and simultaneously is suitable for fast level adjustment, or includes this, and then requires only an extremely small amount of power.

OBJECT AND SUMMARY OF THE INVENTION

An object of the invention is to control motion of a motor vehicle to reduce not only the usual rolling, pitching and yawing of the body during such driving maneuvers as braking, cornering and the like but also offers substantial improvement in terms of both the ride and handling. It is also possible, simultaneously, not only to control the body motions that can be ascribed to dynamic load change events but also to correct the body position in static load changes (when the load increases), or in other words to perform the task of conventional level adjustment systems.

It is also especially advantageous that the power consumption, which is already very greatly reduced in comparison with fully active hydraulic chassis systems, can, in systems for fast level adjustment such as those known from German Offenlegungsschrift 37 38 284, be decisively reduced further by suitable provisions; to name figures accordingly, given a suitable design of the components in the component assembly according to the invention, only 20% as much power is needed for body control, compared with the energy consumption of a fully active hydraulic system.

Another advantage is that the static and dynamic changes in load can be securely mastered by the body control according to the invention, even though the invention is based on an extremely soft total spring characteristic; as a result, it is possible to make a decisive improvement in the comfort of the ride. Despite the soft spring characteristic, the spring deflection path can be kept at a minimal length, because of the design of the final control elements provided.

The invention also makes so-called failsafe operation possible, since upon shutoff of the fast level adjustment, or in other words upon interruption of the triggering of the existing triggerable components, the vehicle can continue to be operated, because of the soft basic tuning.

Since as already mentioned only a very small power requirement is necessary, economical components can be used for triggering and switching the pneumatic or hydraulic pressure fluid to generate this power; the pressure level when a hydraulic final control element is used is approximately 80 to 120 bar, and when a pneumatic final control element is used is approximately 8 to 10 bar; however, it will be understood that these figures merely explain the invention and give examples but are not to be understood as limiting; this is equally applicable to other figures given hereinafter.

Another advantage is that in the present invention only the body is controlled; that is, the active final control element provided, and the valve units associated with it, must merely be operated in a frequency range of approximately 4 to 5 Hz, and so the component demands are slight, compared with fully active systems.

Because of the integrated compensation spring provided here, the demands in terms of the necessary force level of the final control element can also be drastically reduced, which makes it possible to use small final control elements, with correspondingly small valve units. The demands for active hydraulic systems, which upon overtaking a threshold for instance must open large valve cross sections within milliseconds, can be dispensed with, since a further integrated in the final control element compensates for such demands.

Because of the compact structure of the final control element, which is possible because of the smaller dimensions for the components made possible by the reduced demands, it is also possible for dynamic flow effects in the incoming lines to be largely ignored.

Finally, another advantage of the present invention, especially with the intended hydropneumatic final control elements, is that because it is not very demanding in terms of control speed, more-economical switching valves, of the kind also used for instance in ABS control (ABS=anti-skid braking), can be used, rather than proportional valves which might possibly be advantageous for other reasons; to use these switchover valves, all that needs to be done is to adapt a corresponding control algorithm to them.

If the final control element is embodied in both pneumatic and hydropneumatic form, then the required oil or air pressure level in the actuator in the final control element can be reduced accordingly, by means of a spring disposed in the monitoring or control volume.

Compared with fully active hydraulic systems, the necessary components in the present invention can therefore be substantially lower in weight, because there is less strain on them; from the standpoint of weight, a favorable component design becomes possible because of the low pressure levels and simpler valves as well as the less stringent demands made of the supply unit; this is especially true when the system has a hydropneumatic embodiment.

The provisions recited hereinafter add to the features and improvements set forth by the invention as disclosed hereinafter. A particularly advantageous provision is an adjustment of the total spring rate of a compensation spring disposed parallel to the final control element and the spring rate of the final control element spring characteristic in such a way that they match the total spring rate required for the characteristic natural frequency of the vehicle body. The extremely soft compensation spring supports the majority of the static weight of the body, while the harder final control element spring supports the remainder of the body weight on the applicable wheel unit so that depending on the number of wheels present on the motor vehicle, a corresponding number of component assemblies according to the present invention is used. Because of the extremely soft chassis tuning, the invention therefore makes possible a considerable improvement in the comfort of the ride, without having a negative effect on the spring deflection path, which is oriented to the final control element reaction.

Since the apparatus according to the invention can be used in all wheel units, and the various component assemblies can naturally be operated independently of one another, it is therefore also possible, by purposefully controlling the various units differently, to vary the transient behavior of the particular motor vehicle, especially in erratic cornering or in erratic braking, in such a way as to produce oversteering or understeering, for instance, thus decisively improving the handling by triggering the various component assemblies at the wheel units differently.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 schematically shows a first exemplary embodiment of a component assembly for active chassis control in motor vehicles, having an air spring as a compensation spring and having a pneumatic final control element;

FIG. 2, likewise schematically, shows a component assembly comparable to that of FIG. 1, with a conventional steel spring as the compensation spring, a separate shock absorber in a semiactive version being additionally provided for both embodiments of FIGS. 1 and 2.

DESCRIPTION OF THE PREFERRED EMBODIMENTS

The basic concept of the present invention is to dispose three component elements, each of which can be embodied in various ways, parallel to one another between the body and wheel of a motor vehicle, in each case as a supplement to a wheel unit. A compensation spring in the form of a conventional steel spring or as an air spring element, in order to bear a majority of the body weight; a final control element of hydraulic or pneumatic type, for body control of dynamic load fluctuations, but also in the form of an electromagnetically adjustable torsion bar; and a component element, acting as a parallel semiactive shock absorber, are all provided, thus assuring a stable system behavior; and the passive damping component of the system primarily monitors the wheel motion, especially in the limit range of the intrinsic wheel motion. This is also the reason why the final control element with its various components need be designed merely for the vibrations of the vehicle body; in other words, it controls only the body and therefore, with its associated valve units, needs to control merely a frequency range of approximately 4 to 5 Hz, or a range on this order of magnitude.

Figure 1A:
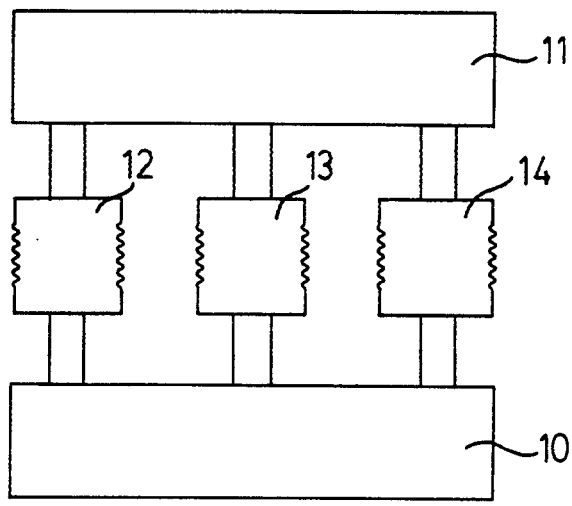
FIG. 1a illustrates three control elements in parallel.
Figure 1B:
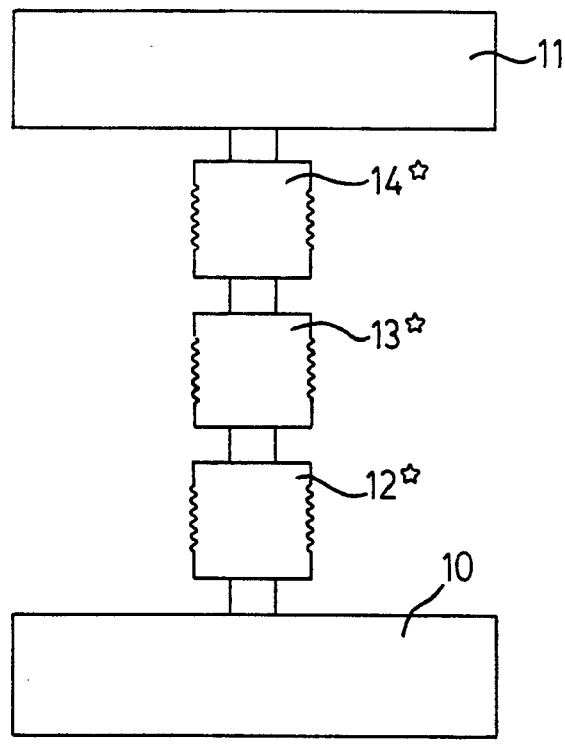
FIG. 1b illustrates three control elements in series.
Figure 3:
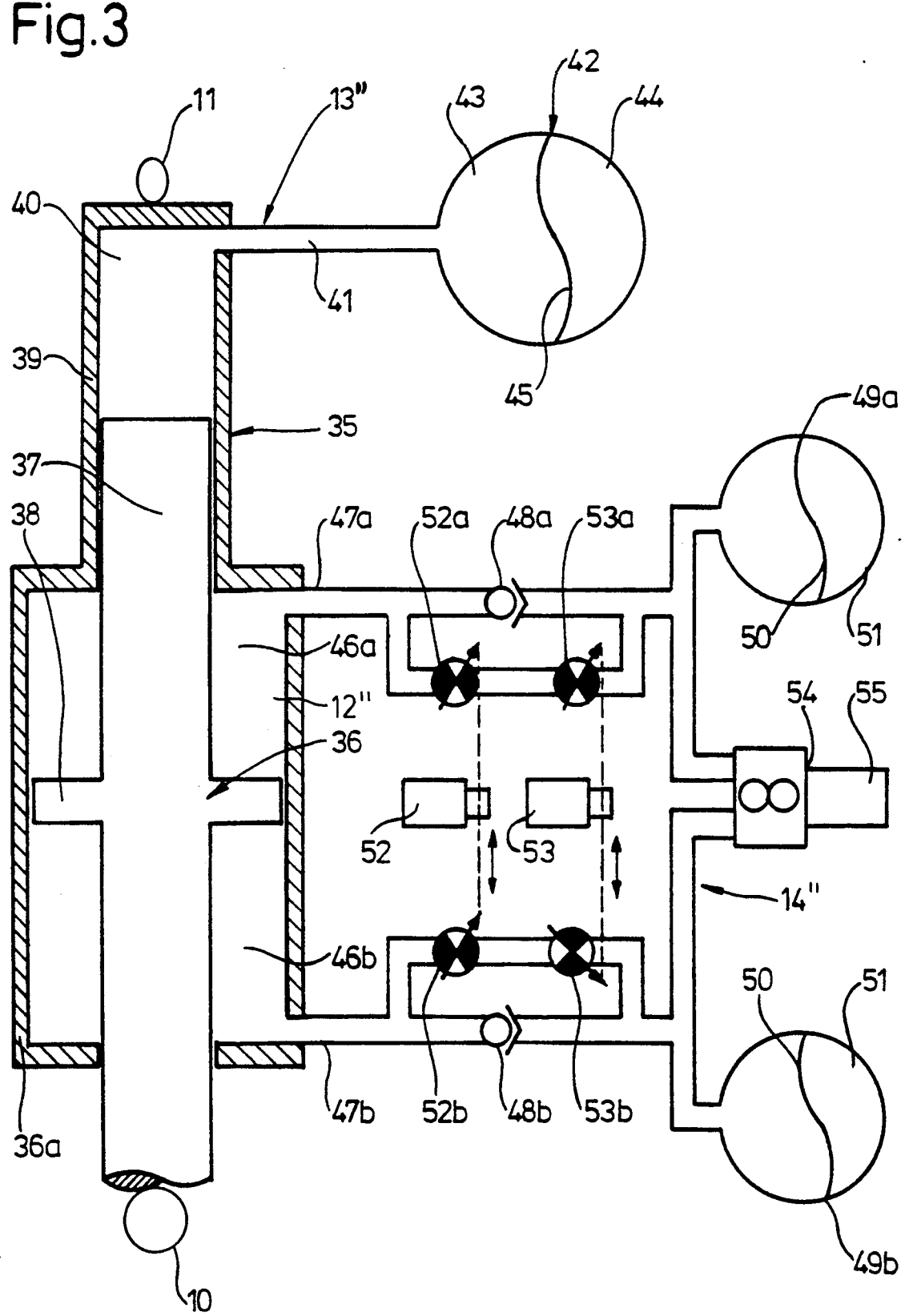
FIG. 3 schematically shows a complete active chassis control system with level adjustment, including semiactive damping for the tension and compression stages.

In all three exemplary embodiments of FIGS. 1, 2 and 3, the wheel is represented as a relatively large black dot 10 at the bottom; the vehicle body is represented by the black dot 11 on top. The component assembly according to the invention is located between the wheel 10 and the body 11 and comprises the aforementioned three structural elements—namely, and referring fist to FIG. 1, a final control element 12, which in this embodiment is pneumatic, including the valve units 12a associated with it; a compensation spring 13, designed as an air spring in the embodiment of FIG. 1; and a third structural element in the form of a so-called semiactive damper, which is merely schematically shown at 14 and may be embodied in such a way, and preferably is indeed so embodied, as described in detail both in the aforementioned German Offenlegungsschrift 36 10 937 which was filed in the United States, resulting U.S. Pat. No. 4,786,034 and in European Patent Application 86 103082,3-2306, so that with express reference to these publications, no further detailed description of the structure and function of such a semiactive damper will be made in the ensuing description of the invention, for the sake of simplicity.

However, it will be understood that for triggering the semiactive damper 14, and the final control element valve units, a central electric or electronic control unit is provided, which has been shown in block form in the drawing, to which a number of operating states and other external signals are supplied via sensors 51-57, such as information on the speed of the two bodies (the wheel 10 and the vehicle body 11) relative to one another, the absolute speeds of these two bodies, the load state, distribution of load per axle, vehicle speed, longitudinal and transverse acceleration, unevenness of the road surface, steering deflection, and the like. The central control unit advantageously processes these signals, along with other data, including data called up from internal memories, in accordance with predetermined, likewise stored programs, and triggers the various valve units, including those in the region of the semiactive shock absorber, such that the desired driving states are attained. The control unit and sensors shown in FIG. 1 apply as well to FIGS. 2 and 3. No further detail may be provided on this point, since the present invention relates solely to the disposition and association of the various components and their embodiment.

In principle, all three structural elements in the exemplary embodiments of FIGS. 1, 1a, 2 and 3 are disposed parallel between the body and the wheel suspension; the compensation spring 13, 13', 13" (see also the other drawing figures) has the task of compensating for and bearing the majority of the body weight resting on the applicable suspension unit. FIG 1b illustrates the three structural elements in series between the body and the wheel.

In FIG. 1, the compensation spring is embodied as an air spring 13 and includes a bellows structure 13a, which is secured in a sealed manner to a lower bearing element 15 secured to the wheel and an upper bearing element 16 secured to the body, as is generally typical for air springs, so that upon spring deflection, the bellows executes a corresponding rolling motion. The pressure fluid located inside the bellows may for example be air.

The lower bearing element 15 and upper bearing element 16 can also be components, which may be integral components, of a piston/cylinder unit 17, which is a component of the pneumatic final control element 12, and in which the cylinder shape 13a forms a work chamber 18, of which the piston structure 19 sliding in the cylinder shape 17a defines one wall.

The inlet and outlet openings 20a, 20b of an inlet valve 21a and an outlet valve 21b, respectively, open at an arbitrary point, from above in the case of FIG. 1, into the work chamber 18. The inlet valve 21a and the outlet valve 21b can in principle be of arbitrary shape and structure; in the exemplary embodiment shown, conically extending valve bodies 22 are provided that rest against the seats formed by the inlet and outlet openings 20a, 20b, are subject to the prestressing of springs 23 that engage the back sides of these valve bodies, and communicate via a kind of piston rod 24 with an electromagnetic switching system, preferably in the form of control magnets 25a, 25b, which control the opening and closing motions of the inlet and outlet valves as a function of the trigger signals of the central logic unit sent to the control magnets 25a, 25b. For this purpose, other external connections are also provided, namely an inlet connection 26, which communicates with a conventionally embodied fluid energy supply, and an outlet connection 27, which receives the return flow of the final control element 12. As shown in FIG. 1 the outlet connection is connected with a return line that returns the fluid to a tank. The tank is shown connected with the fluid energy supply.

It will be understood that the semiactive damper 14 shown inside the air spring in FIG. 1 will naturally not be located at this point in a practical exemplary embodiment and is shown there merely for the sake of space. The damper 14 is shown with an arrow which indicates that it is variable and is shown connected with the control unit.

Since the exemplary embodiment of FIG. 2 is comparable to that of FIG. 1, except that the three structural elements are embodied differently, FIG. 2 will now be described directly; the reference numerals of the components are the same but are provided with a prime to distinguish them.

The compensation spring is embodied here as a steel spring 13', but naturally may also be in the form positioned between the upper load bearing element 16' and the lower load bearing element 15' of an air spring element as already shown in FIG. 1.

Since all the final control elements have the common property that spring elements connected in parallel between their fastening points act as the compensation spring 13, 13', 13", the hydraulic final control element 12' provided in FIG. 2 is connected in series with an additional spring element 28, while purely pneumatic final control elements as in FIG. 1 automatically meet the spring element demands, since in principle pneumatic cylinder/piston elements have a spring-like characteristic.

The hydraulic final control element 12' shown in FIG. 2 represents a rigid connection between its fastening points, the length of which connection can be adjusted, specifically by a suitable triggering of inlet and outlet valves 21a', 21b' provided once again here. The spring element 28 connected in series with the hydraulic final control element is embodied in the exemplary embodiment shown in FIG. 2 as an air spring; but it may also be a steel spring. In actuality, this additional spring element 28 is necessary because otherwise a hydropneumatic final control element of this kind would degenerate into a final control element as in fully active hydraulic chassis, which would have to be regulated both in terms of body motion and wheel motion and would then make the extremely high demands for power referred to at the outset.

The additional spring 28 provided here takes the wheel motion into account and make it possible for the actual final control element 12, 12' to regulate the body motion exclusively, as is also the case in FIG. 1; the wheel motion is in fact especially monitored in the frequency range of the natural frequency of the wheel, primarily by the frequency-dependent passive damping component of the semiactive damper 14.

The structure of the hydraulic final control element 12' of FIG. 2 also includes a piston/cylinder unit 17' having a piston 19', one wall of which defines the work chamber 18' of the thus-formed actuator. The piston is extended downward via a piston rod 29, which integrally merges with the upper bearing plate 30 for the additional spring element 28, which is embodied as an air spring with a roll bellows 28a. A lower bearing element 15' firmly connected to the wheel forms the retaining structure for the roll bellows 28a on the other side of the air spring element.

An additional reinforcement spring 31 may also be located inside the work chamber 18' of the actuator 17' of the hydraulic final control element 12'; once again, the inlet 20a' of the inlet valve 21a' opens into the work chamber 18' and the inlet valve communicates with a hydraulic pressure supply via the connection 26', and an outlet opening 20b', which also opens into this work chamber is controlled by the outlet valve 21b' and is connected to the return connection 27'.

In order to have adequate hydraulic pressure fluid available here, the actual cylinder/piston unit 17' of the hydraulic final control element 12' is surrounded by a hydraulic pressure reservoir 32, which via a partition 33 merges with a pneumatic pressure reservoir region 34; the pressure supply communicates directly with the pressure reservoir 32, from which the inlet valve 21a' admits the pressure fluid to the work chamber 18'.

It will be understood that the spring elements 28, 31 integrated into or assigned to the final control elements are designed to match the total spring characteristic of a suspension unit and as a function of the proportion of the total spring characteristic furnished by the compensation spring.

In the pneumatic final control element system of FIG. 1, a certain proportion of the vehicle body weight must be supported by the final control element, so that the compensation spring there, as an air spring 13, must not be allowed to support all the vehicle body weight. One reason this is necessary is to enable lowering of the vehicle body if desired (as a function of speed or road surface); another reason is that a certain spring characteristic of an air spring requires a certain initial load or a certain initial pressure. However, this is not necessary, if as is also possible a torsion bar (which is for instance electromechanically adjustable) or other spring elements are used as a final control element, because in that case the spring characteristic is independent of the prestressing.

As mentioned, in the cases of both FIGS. 1 and 2, the semiactive damper disposed parallel to the compensation spring and to the final control element acts as a stabilizing element and is necessary for overall system performance.

Unlike the exemplary embodiments of FIGS. 1 and 2, in the component assembly shown in FIG. 3 the semiactive damper, although it is present as a parallel-acting third element, is integrated in such a way into the region of the final control element that a unitary integral basic concept can be achieved with a special embodiment, as shown.

FIG. 3, in a parallel-connected action, shows two piston/cylinder units 35 and 36; the two units are interconnected in such a way that one common piston 37 in the lower portion of FIG. 3 simultaneously performs final control element 12" and damper functions, with an enlarged annular protrusion 38 forming the actual piston, while in an extension upward the piston 37 slides in a tapered cylinder region 39, and here in combination with an upper work chamber 40 forms a hydropneumatic spring, which communicates via a connecting conduit 41 with a supply tank 42, which contains a hydraulic fluid at 43 and compressed gas, such as air, which acts as a spring element for the thus-embodied compensation spring 13", at 44, the two fluids being separated by a partition 45.

The annular protrusion 38 divides the cylinder 36a of larger circumference of the lower cylinder/piston unit, for purposes of achieving a final control element and semiactive damping, into an upper compression stage work chamber 46a and a lower tension stage work chamber 46b. Each work chamber communicates with a compensation volume container 49a for the compression stage and 49b for the tension stage, via a connecting conduit 47a, 47b and a check valve 48a, 48b opening in the opposite direction; in general, a hydraulic pressure fluid is present in the work chambers up to both containers 49a, 49b and in all the valve units, while for pressure equalization the containers typically also include a volume 51 of air at the back, in each case separated by a partition 50.

An essential feature, to realize semiactive damping and final control element properties as shown in FIG. 3, is that parallel to the check valves 48a, 48b, the series circuits of two valves each, 52a, 53a for the compression stage and 52b, 53b for the tension stage, are provided; they are embodied as proportional valves or as fast switchover valves, in which case they have a corresponding control algorithm, and they effect the control of pressure fluid into and out of the respective compression stage and tension stage work chambers.

In the exemplary embodiment shown in FIG. 3, the final control element 12" and the semi-active damper unit 14" are realized in the form of a common, combined unitary actuator 12", 14". This actuator substantially includes the piston/cylinder units 35, 36, the annular protrusion 38, the cylinder 36a, the work chambers 46a, 46b, the check valves 48a, 48b, and the valves 52a, 53a, 52b, 53b, which can be controlled with the aid of the control unit 42, 53, as described in the preceding paragraph and as can be seen from the drawing.

To this end, common control units for valves associated with one another in the two parallel branches are provided, specifically a control unit 52 for the two valves 52a (compression stage) and 52b (tension stage), and a control unit 53 for the two valves 53a (compression stage) and 53b (tension stage). Another essential condition, particularly to achieve the semiactive damping properties in the manner described in detail in the aforementioned German Offenlegungsschrift 36 10 937, is that the control unit 52 influences the active component and the control unit 53 the passive component of the semiactive damper adjustment; it should also be noted that the two "passive" valves 52a, 52b are regulated in the same direction, but the two "active" valves 53a, 53b are contrarily regulated in opposite directions. The control units 52, 53 may be embodied mechanically or electronically.

The structure of the final control element/damping combination is finally completed by a hydraulic pump 54 without leakage, which is driven by a self-inhibiting drive mechanism 55. The result is a level adjusting unit, in cooperation with the purposeful triggering of the valve groups 52a, 53a and 52b, 53b.

The level regulation is therefore effected by raising or lowering the pressure level in the respective compression stage or tension stage work chambers by means of the pump 54, while the final control element and damper function combined is achieved by the purposeful triggering of the valve groups 52a, 52b, 53a, 53b.

As a result, in all embodiments, the invention successfully achieves fast level adjustment with extremely low power consumption and simultaneous active chassis regulation by using a suitably tuned compensation spring disposed parallel to the final control element, which in turn has its own spring characteristic. The sum of the two spring rates must match the total spring rate required for the characteristic natural frequency of the vehicle body; the final control element spring is designed as substantially harder than the compensation spring, which should be of as low spring rigidity as can possibly be technically achieved. In fact, the greater the proportion of the static load that is borne by the compensation spring and the lower its spring rigidity, the less energy is required for vehicle body control upon dynamic load fluctuations.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for active control of body motions in motor vehicles having a body and axles with wheels, for reduction of undesired vehicle body motions, for improvement of the comfort of a ride, and for simultaneous fast level adjustment, with low total energy consumption for the active control, which comprises:

a very soft compensation spring which bears a majority of the static weight of the vehicle body (11);

a fluid energy supply;

a final control element (12, 12', 12'') having its own suspension characteristic that is stiffer than the compensation spring is provided parallel to the compensation spring, via said final control element (12, 12'), the fast level adjustment and the body motion is controlled by said fluid energy supply and an electronic control unit; and a semiactive damper unit that acts parallel to said final control element (12, 12', 12'') and said compensation spring.

2. An apparatus as defined by claim 1, in which the compensation spring is selected from a group consisting of an air spring (13), a steel spring (13') and a hydropneumatic spring (13''), and its own, extremely soft spring characteristic is dimensioned in combination with a spring element characteristic of the final control element (12, 12') such that a sum of the frequency rates of the two springs approximately matches a total spring rate necessary for a characteristic natural frequency of the vehicle body.

3. An apparatus as defined by claim 2, in which the final control element (12) is embodied by a cylinder/piston unit (17), said cylinder/piston unit 17 includes a piston (19) connected mechanically to one of said wheels, said piston (19) defines one wall of a work chamber (18), which communicates with the fluid energy supply via an inlet valve (21a) controlled by said electronic control unit and with a return flow connection (27) via an outlet valve (21b) controlled by said electronic control unit.

4. An apparatus as defined by claim 2, in which said final control element (12') is embodied as a hydraulic final control element, and connected in series with a further spring element (28) and has a hydraulic work chamber (18'), said hydraulic work chamber is acted upon via an inlet valve (21a') from a pressure reservoir (32) with hydraulic pressure fluid, which flows out into a return line (27') via an outlet valve (21b') from the work chamber (18'), the inlet and outlet valves being controlled by said electronic control unit.

5. An apparatus as defined by claim 2, in which the final control element includes two chambers, divided by a piston into a tension stage work chamber and a compression stage work chamber; these chambers communicate with one another via throttle valves triggerable independently of one another, in which case active damping signals corresponding to absolute speed of one of said wheels and vehicle body motion influence the throttle valves (53a, 53b) to be actuated in opposite directions, and passive damping signals corresponding to the relative speed of one of the wheels and vehicle body motion influence the throttle valves in the same direction for both motion directions, that is for a tension stage and for a compression stage, to achieve semiactive damper functions, said throttle valves communicate by means of a fast damper valve, which is actuatable with high frequency and which may be embodied as a force control element.

6. An apparatus as defined by claim 2, in which said final control element (12'') and the semi-active damper unit are combined in a unitary control unit for realizing final control element functions and damping functions in common, said unitary control unit including two work chambers (46a, 46b), one for a compression stage and one for a tension stage, which communicate with said fluid energy supply via a pair of valves (52a, 53a; 52b, 53b), each pair of valves are connected in series with one another and are connected in parallel with a check valve (48a, 48b).

7. An apparatus as defined by claim 1, in which the final control element (12) is embodied by a cylinder/piston unit (17), said cylinder/piston unit 17 includes a piston (19) connected mechanically to one of said wheels, said piston (19) defines one wall of a work chamber (18), which communicates with the fluid energy supply via an inlet valve (21a) controlled by said electronic control unit and with a return flow connection (27) via an outlet valve (21b) controlled by said electronic control unit.

8. An apparatus as defined by claim 1, in which said final control element (12') is embodied as a hydraulic final control element, and connected in series with a further spring element (28) and has a hydraulic work chamber (18'), said hydraulic work chamber is acted upon via an inlet valve (21a') from a pressure reservoir (32) with hydraulic pressure fluid, which flows out into a return line (27') via an outlet valve (21b') from the work chamber (18'), the inlet and outlet valves being controlled by said electronic control unit.

9. An apparatus as defined by claim 1, in which the final control element includes two chambers, divided by a piston into a tension stage work chamber and a compression stage work chamber; these chambers communicate with one another via throttle valves triggerable independently of one another, in which case active damping signals corresponding to absolute speed of one of said wheels and vehicle body motion influence the throttle valves (53a, 53b) to be actuated in opposite directions, and passive damping signals corresponding to the relative speed of one of the wheels and vehicle body motion influence the throttle valves in the same direction for both motion directions, that is for a tension stage and for a compression stage, to achieve semiactive damper functions, said throttle valves communicate by means of a fast damper valve, which is actuatable with high frequency and which may be embodied as a force control element.

10. An apparatus as defined by claim 1, in which said final control element (12'') and the semi-active damper unit are combined in a unitary control unit for realizing final control element functions and damping functions in common, said unitary control unit including two work chambers (46a, 46b), one for a compression stage and one for a tension stage, which communicate with said fluid energy supply via a pair of valves (52a, 53a; 52b, 53b), each pair of valves are connected in series with one another and are connected in parallel with a check valve (48a, 48b).

11. An apparatus as defined by claim 10, in that said compensation spring (13″) is connected for acting parallel to the final control element and damper unit.

12. An apparatus as defined by claim 11, in which said compensation spring is embodied by a cylinder/piston unit (35), a hydraulic work chamber (40) which communicates with a supply tank (42), and said supply tank contains in addition to a hydraulic fluid a compressed gas cushion (44) separated from the hydraulic fluid.

13. An apparatus as defined by claim 10, in which a common cylinder/piston unit (36), includes an extending piston rod which simultaneously forms a piston of a cylinder/piston unit (35) for the compensation spring (13″).

14. An apparatus as defined by claim 13, in which said common cylinder/piston unit separates the upper compression stage work chamber (46a) and lower tension stage work chamber (46b) by means of an outer annular protrusion (38), the work chambers communicate via connecting lines (47a, 47b) with check valves (48a, 48b) contained in these lines, the compression stage work chamber connecting line communicationg with a compensation volume container for the compression stage and the tension stage work chamber connecting line communicating with a compensation volume container for the tension stage, connected in parallel to each check valve (48b) is a series circuit of triggerable throttle valves; first throttle valves (52a, 52b) are each triggered and connected in the same direction for control and damper adjustment of the active component, and second throttle valves 53a, 53b are each triggered and connected in opposite directions in common, to regulate the passive damping component of the control units (52, 53).

15. An apparatus as defined by one claim 14, in which the lines (47a, 47b) respectively leading to the compression stage work chamber (36a) and the tension stage work chamber (46b) also communicate with a hydraulic pump (54) that pumps hydraulic pressure fluid.

16. An apparatus as defined by claim 15, in which said pump that pumps the hydraulic pressure fluid is a hydraulic pump without leakage, and is driven by a self-inhibiting drive mechanism (55) in such a manner that a level adjustment is effected by means of the pump, by selective raising and lowering of the pressure level in the work chambers.

17. An apparatus as defined by claim 1, in which said electronic control unit includes sensors and a central logic circuit that triggers various valve units (21a, 21b; 21a′, 21′; 52a, 52b; 53a, 53b) of the final control element (13, 13′), said sensors supply sensor signals relating to the relative speed of the vehicle body and wheels, the absolute speeds of the vehicle body and wheels, a load state, a distribution of load to the axles, the vehicle speed, longitudinal and transverse accelerations of the vehicle, and unevenness of the road surface, a steering deflection, and a logic circuit which triggers the valve drive mechanisms.

18. An apparatus for active control of body motions in motor vehicles including wheels, for reduction of undesired vehicle body motions, for improvement of the comfort of a ride, and for simultaneous fast level adjustment, with low total energy consumption for the active control, which comprises:
- a very soft compensation spring which is dimensioned such that it bears a majority of the static weight of the vehicle body (11);
- a fluid energy supply;
- a final control element (12, 12′) having its own suspension characteristic that is stiffer than the compensation spring is provided parallel to the compensation spring, via said final control element (12, 12′) and a force for influencing the body motion is actively generated without a relative motion between the wheels (10) and the vehicle body (11); and
- a semiactive damper unit that acts parallel to said final control element (12, 12′) and said compensation spring.

19. An apparatus for active control of body motions in motor vehicles including wheels, for reduction of undesired vehicle body motions, for improvement of the comfort of a ride, and for simultaneous fast level adjustment, with low total energy consumption for the active control, which comprises:
- a very soft compensation spring which is dimensioned such that it bears a majority of the static weight of the vehicle body (11);
- a fluid energy supply;
- a final control element (12, 12′) having its own suspension characteristic that is stiffer than the compensation spring is provided parallel to the compensation spring via the final control element (12, 12′), the fast level adjustment and a force for influencing the body motion is generated actively and largely independent of a relative motion between the wheels 10 and the vehicle body; and
- a semiactive damper unit that acts parallel to said final control element (12, 12′) and said compensation spring.

20. An apparatus for active control of body motions in motor vehicles having wheels (10) for reduction of undesired vehicle body motions, for improvement of the comfort of a ride, and for simultaneous fast level adjustment, with low total energy consumption for the active control, which comprises:
- a very soft compensation spring which is dimensioned such that it bears a majority of the static weight of the vehicle body (11);
- a fluid energy supply,
- a final control element (12, 12′) having its own suspension characteristic that is stiffer than the compensation spring is provided parallel to the compensation spring and by supplying energy from said fluid energy supply via the final control element (12, 12′), a fast level adjustment and a spacing between the wheels (10) and the vehicle body (11) is controlled largely independently of a relative body motion between the wheels (10) and the vehicle body; and
- a semiactive damper unit that acts parallel to said final control element (12, 12′) and said compensation spring.

* * * * *